Patented Nov. 20, 1923.

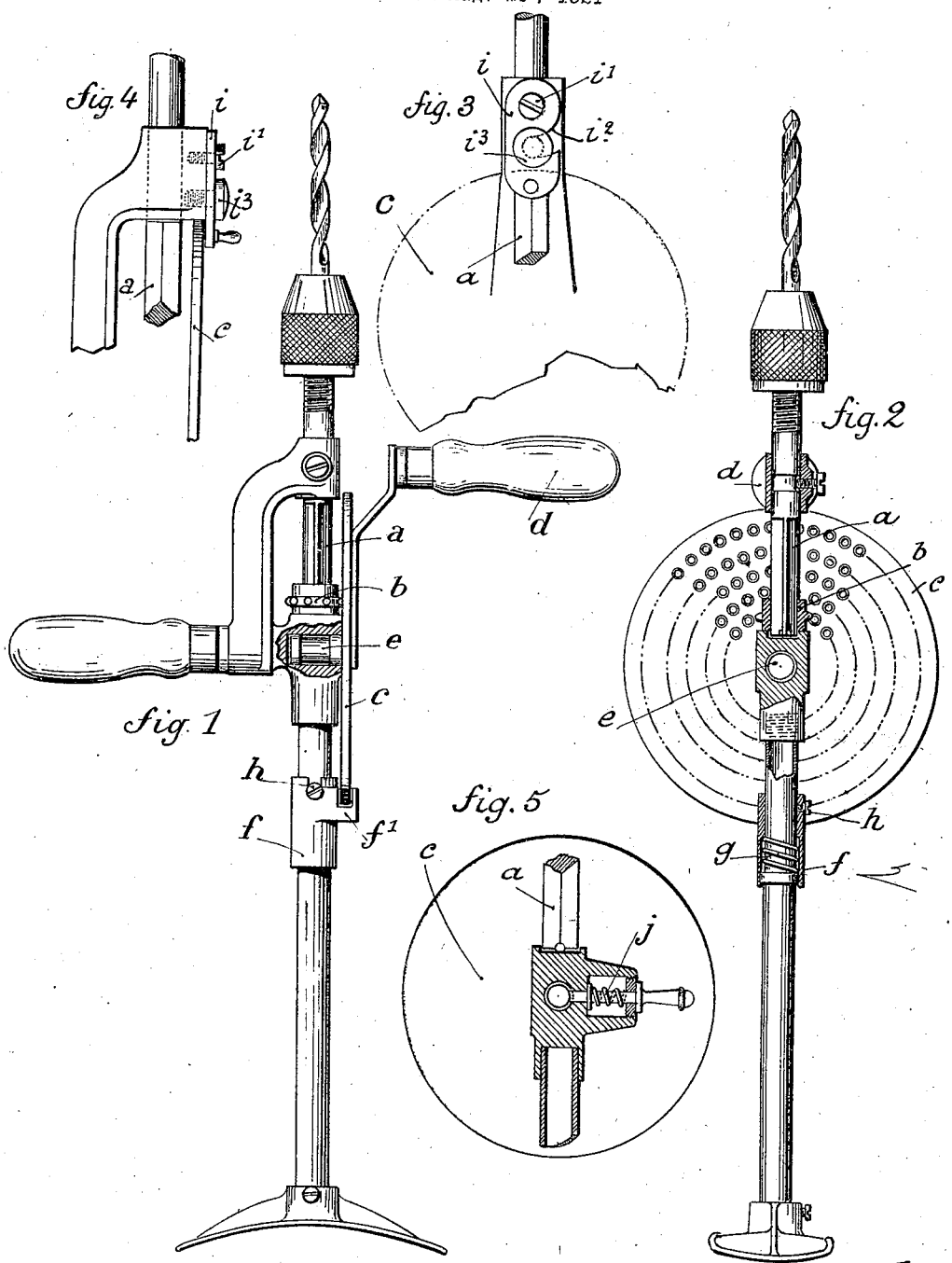

1,474,679

UNITED STATES PATENT OFFICE.

VICTOR GUSTAVE LUTZ, OF PARIS, FRANCE.

HAND DRILL PROVIDED WITH A SPEED-CHANGING DEVICE.

Application filed August 29, 1921. Serial No. 496,405.

(GRANTED UNDER THE PROVISIONS OF THE ACT OF MARCH 3, 1921, 41 STAT. L., 1313.)

*To all whom it may concern:*

Be it known that I, VICTOR GUSTAVE LUTZ, a citizen of the Republic of France, and residing at Paris, Seine Department, No. 70 Rue Montmorency, in the Republic of France, engineer, have invented certain new and useful Improvements in Hand Drills Provided with Speed-Changing Devices (for which I have filed applications in Belgium dated May 9, 1914, and in France, dated May 8, 1915), of which the following is a specification.

My invention relates to improvements in hand drills provided with gearing whereby several speeds may be obtained. One of the objects of said improvements is to provide devices of simple construction, convenient use and reliable operation for effecting the change in speed ratio between the drill handle and the shaft carrying the drill point.

The following description, together with the accompanying drawings which are given by way of example, sets forth a form of construction of a hand drill according to my invention.

Figs. 1 and 2 show a front and a side elevation of a hand drill constructed according to this invention.

Figs. 3 and 4 show a front and a side elevation of a modified form of the engaging and releasing devices.

Fig. 5 is an elevational view of another modified form of the said devices.

The drill which is shown in Figs. 1 and 2 comprises a drill point carrying shaft $a$ whose actuating mechanism is composed of a wheel $b$ provided with points and slidable upon a square portion of the shaft $a$, and a disc $c$ having therein concentric rows of apertures so disposed that the distance between centers of any two consecutive apertures shall be equal to the pitch of the wheel $b$. This latter is secured to a shaft $e$ mounted in a circular recess formed in the frame, and the drill is provided with a handle $d$ for rotating the said shaft.

A sleeve $f$ which is slidable on the frame of the drill is provided with a lateral extension $f^1$ having therein a groove of a width equal to the thickness of the disc $c$ and so disposed that when the said disc engages the said groove and the wheel $b$ is situated at a distance from the shaft $e$ which is equal to the radius of one of the circular rows of apertures in the said disc, this latter and the said wheel will now be engaged. The sleeve $f$ is provided with a spring $g$ which tends to impel the same towards the disc $c$ and with a screw $h$ whereby it may be secured to the main frame of the drill in any desired position.

To obtain a change of speed, it will suffice, when the wheel $b$ is engaged with one of the sets of apertures in the disc $c$, to move the sleeve $f$ away from the said disc, then move the latter away from the main frame of the drill, then move the wheel $b$ to the proper distance from the shaft $e$ corresponding to the next speed to be obtained, and return the disc into position to again engage the wheel $b$ and bring the sleeve $f$ towards the said disc in such manner that the latter will extend into the groove of the said sleeve. Suitable packing may be disposed between the shaft $e$ and the corresponding recess, or means may be provided whereby the said shaft shall be caused to fit exactly within the said recess, the latter being filled with oil in such manner as to constitute a fluid-tight assemblage acting as a suction pump. This will obviate the complete removal of the shaft $e$ from the recess during the speed-changing operation.

Referring to the modified form of construction as shown in Figs. 3 and 4, the sleeve $f$ and the extension thereof $f^1$ may be replaced by a disc $i$ movable upon the shaft $i^1$ mounted on the frame of the drill and having therein a groove $i^2$ co-operating with a stud $i^3$ secured to the drill frame, whereby the disc $c$ shall be prevented from moving parallel to the axis thereof when in this position. For the disengaging effect, the disc $i$ is rotated in such manner as to release the disc $c$. In order to prevent the disc $c$ from effecting a displacement parallel to the axis thereof, recourse may be had to a spring bolt $j$, Fig. 5, disposed upon the drill frame and engaging a groove formed in the shaft of the said disc.

Claims:

1. In a hand drill, the combination of a main frame, a drill point carrying shaft journaled in the said frame, a gear wheel slidable on the said shaft and revoluble thereby, an engaging disc having therein a plurality of concentric circular rows of apertures co-operating with the teeth of the said gear wheel, the said disc being provided with a pivot axle journaled in the said frame and disposed perpendicularly to the said shaft, and means disposed upon the said frame for maintaining the said disc in the normal position of engagement with the said gear wheel, said disc when in a normal position preventing displacement of the said gear wheel along the shaft.

2. In a hand drill, the combination of a main frame, a drill point carrying shaft journaled in the said frame, a gear wheel slidable on the said shaft and revoluble thereby, the said gear wheel being provided at the periphery with teeth, an engaging disc having therein a plurality of concentric circular rows of apertures adapted to engage the teeth of the said gear wheel, the said disc being disposed upon the main frame in such manner as to rotate about an axis perpendicular to the said shaft, and spring-pressed means slidable on the said frame for maintaining the said disc in the normal engaged position.

3. In a hand drill, the combination of a main frame, a drill point carrying shaft journaled in the said frame, a gear wheel slidable on the said shaft and revoluble thereby, the said gear wheel being provided at the periphery with teeth, an engaging disc having therein a plurality of concentric circular rows of apertures adapted to engage the teeth of the said gear wheel, the said disc being disposed upon the main frame in such manner as to rotate about an axis perpendicular to the said shaft, and means guided upon the frame in a plane parallel to that of the disc and adapted to prevent the said disc from receding from the said shaft when it is desired to retain the disc in engagement with the said gear wheel and to enable the disc to be disengaged from the wheel with facility for the purpose of changing the speed.

4. In a hand drill, the combination of a main frame, a drill point carrying shaft journaled in the said frame, a gear wheel slidable on the said shaft and revoluble thereby, an engaging disc having thereon a plurality of concentric circular rows of apertures co-operating with the teeth of the said gear wheel, the said disc being provided with a pivot shaft journaled in the said frame and disposed perpendicularly to the said shaft, the said pivot shaft being of cylindrical shape and having a circular groove therein, being slidably mounted upon the main frame, locking means disposed upon the frame and adapted to engage the said groove of the pivot shaft, and a spring adapted to engage said locking means with said groove in order to prevent sliding of the gear disc.

In testimony that I claim the foregoing as my invention I have signed my name in presence of two subscribing witnesses.

VICTOR GUSTAVE LUTZ.

Witnesses:
C. COUTAL,
MAURICE ROUX.